US009104751B2

(12) United States Patent
Siamwalla et al.

(10) Patent No.: US 9,104,751 B2
(45) Date of Patent: Aug. 11, 2015

(54) SUPPLEMENTAL SEARCH RESULTS HAVING SOCIAL CONNECTION ENDORSEMENT DATA ON A SERP

(75) Inventors: Yajie Siamwalla, Belmont, CA (US); Rajesh Krishna Shenoy, San Jose, CA (US); Lei Duan, San Jose, CA (US); Satish Kumar Musukula, San Jose, CA (US); Charles C. Carson, Jr., Cupertino, CA (US); Michael Ching, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 393 days.

(21) Appl. No.: 13/341,561

(22) Filed: Dec. 30, 2011

(65) Prior Publication Data

US 2013/0097144 A1    Apr. 18, 2013

Related U.S. Application Data

(60) Provisional application No. 61/546,351, filed on Oct. 12, 2011.

(51) Int. Cl.
*G06F 17/30*    (2006.01)
*G06Q 10/10*    (2012.01)
*G06Q 50/00*    (2012.01)

(52) U.S. Cl.
CPC .... *G06F 17/30699* (2013.01); *G06F 17/30648* (2013.01); *G06F 17/30867* (2013.01); *G06Q 10/10* (2013.01); *G06Q 50/01* (2013.01)

(58) Field of Classification Search
CPC ............... G06F 17/30864; G06F 17/30861; G06F 17/30876; G06F 17/30386; G06F 17/30648; G06F 17/30867; G06F 17/30828; G06F 17/30554; G06F 17/30964; G06F 17/30634; G06Q 50/01

USPC ......................................................... 707/706
See application file for complete search history.

(56) References Cited

U.S. PATENT DOCUMENTS 7,647,306 B2    1/2010 Rose et al.
7,890,501 B2    2/2011 Lunt et al.
(Continued)

OTHER PUBLICATIONS

Carmel, et al., "Personalized Social Search Based on the User's Social Network", In Proceeding of the 18th ACM Conference on Information and Knowledge Management, Nov. 2-6, 2009, pp. 1227-1236.

*Primary Examiner* — Thanh-Ha Dang
(74) *Attorney, Agent, or Firm* — Dave Ream; Jim Ross; Micky Minhas (57) ABSTRACT

Systems, methods, and computer-readable storage media for presenting supplemental search results having indications that identified documents have been endorsed by the user and/or social network connections of the user are provided. A search query is received and it is determined that the user's social networking data is available. Documents that have been endorsed by the user and/or social network connections of the user are searched to identify those that satisfy the input search query. The satisfying documents are assigned a relevance score to determine whether each satisfying document is relevant enough to be shown and to determine placement of the document on the SERP relative to standard search results. Upon rendering of the SERP, a supplemental search result identifying documents that were endorsed by the user and/or social network connections of the user is presented, as is an indication about which social network connection(s) of the user endorsed the document.

20 Claims, 7 Drawing Sheets

(56) References Cited

U.S. PATENT DOCUMENTS

| | | | |
|---|---|---|---|
| 7,895,177 B2* | 2/2011 | Wu | 707/706 |
| 7,958,110 B2* | 6/2011 | Hood et al. | 707/706 |
| 7,966,325 B2 | 6/2011 | Singh | |
| 8,346,815 B2* | 1/2013 | Dasher et al. | 707/802 |
| 2005/0060297 A1* | 3/2005 | Najork | 707/3 |
| 2005/0137996 A1* | 6/2005 | Billsus et al. | 707/1 |
| 2007/0067282 A1* | 3/2007 | Prakash et al. | 707/5 |
| 2007/0203887 A1* | 8/2007 | Dynin | 707/3 |
| 2008/0005072 A1* | 1/2008 | Meek et al. | 707/3 |
| 2008/0005073 A1 | 1/2008 | Meek et al. | |
| 2008/0109232 A1* | 5/2008 | Musgrove et al. | 705/1 |
| 2008/0243812 A1* | 10/2008 | Chien et al. | 707/5 |
| 2009/0144264 A1* | 6/2009 | Singh et al. | 707/5 |
| 2009/0164929 A1 | 6/2009 | Chen et al. | |
| 2009/0187537 A1 | 7/2009 | Yachin et al. | |
| 2009/0271374 A1 | 10/2009 | Korn et al. | |
| 2009/0282002 A1* | 11/2009 | Reeder et al. | 707/3 |
| 2010/0094869 A1* | 4/2010 | Ebanks | 707/732 |
| 2010/0332330 A1* | 12/2010 | Goel et al. | 705/14.66 |
| 2011/0040741 A1* | 2/2011 | Korte et al. | 707/706 |
| 2011/0184960 A1* | 7/2011 | Delpha et al. | 707/754 |
| 2011/0191315 A1* | 8/2011 | Neumeyer et al. | 707/706 |
| 2012/0084282 A1* | 4/2012 | Chiang et al. | 707/725 |
| 2012/0128250 A1* | 5/2012 | Petrou et al. | 382/182 |
| 2012/0128251 A1* | 5/2012 | Petrou et al. | 382/182 |
| 2012/0215776 A1* | 8/2012 | Guha et al. | 707/728 |
| 2013/0055089 A1* | 2/2013 | Gundotra et al. | 715/733 |
| 2013/0110805 A1* | 5/2013 | Korte et al. | 707/706 |
| 2013/0297591 A1* | 11/2013 | Seefeld et al. | 707/722 |
| 2014/0149373 A1* | 5/2014 | Annau et al. | 707/706 |

* cited by examiner

LIKED BY SOCIAL CONNECTION: STEVE JOBS HIS LIFE

STEVE JOBS: HIS LIFE AND WORK IN PICTURES
VIEW STEVE JOBS: HIS LIFE AND WORK IN PICTURES ON SEARCH ENGINE. SEE STEVE JOBS: HIS LIFE AND WORK IN PICTURES PHOTOS AND FIND MORE PICTURES IN OUR... SEARCHENGINE.COM

👍 JOANN CHEN LIKES THIS

LIKED BY SOCIAL CONNECTION: STEVE JOBS

STEVE JOBS: HIS LIFE AND WORK IN PICTURES
VIEW STEVE JOBS: HIS LIFE AND WORK IN PICTURES ON SEARCH ENGINE. SEE STEVE JOBS: HIS LIFE WORK IN PICTURES PHOTOS AND FIND... SEARCHENGINE.COM

👍 JOANN CHEN LIKES THIS

STEVE JOBS PRESENTS TO THE CUPERTINO CITY COUNCIL... WEBPAGE.COM

👍 ORI ZALTZMAN LIKES THIS

SEARCH ENGINE
WWW.SEARCHENGINE.COM
WELCOME TO SEARCH ENGINE, THE WORLD'S MOST VISITED HOME PAGE. QUICKLY FIND WHAT YOU'RE SEARCHING FOR, GET IN TOUCH WITH FRIENDS AND STAY IN-THE-KNOW WITH THE LATEST NEWS AND...

MAIL           MY SEARCH ENGINE
FINANCE        GAMES
SPROTS         WEATHER

QUICK ACCESS
CUSTOMER SERVICE 555-555-5555
SEARCH THE WEB WITH SEARCHENGINE.COM

SEARCH

LIKED BY YOUR SOCIAL CONNECTIONS ON SEARCHENGINE.COM
STEVE JOBS: HIS LIFE AND WORK IN PICTURES

👍 JOANN CHEN LIKES THIS

SUPPLEMENTAL SEARCH RESULTS HAVING SOCIAL CONNECTION ENDORSEMENT DATA ON A SERP

CROSS-REFERENCE TO RELATED APPLICATIONS

This application claims priority to U.S. Provisional Patent Application No. 61/546,351 filed Oct. 12, 2011 and entitled "Supplemental Search Results Having Social Connection Endorsement Data on a SERP," which application is hereby incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. When a user performs a Web search utilizing a search engine, it can be challenging to choose among several similar-looking results, especially in a case of opinion-preference queries rather than factual ones. Similarly, in some cases, the search result that best meets the user's needs might be one that is not surfaced in the first page of search results and, accordingly, the user may not find it.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, presenting, in association with search engine results pages, supplemental or additional search results (that is, results determined in addition to standard algorithmically-derived Web search results) with indications that identified documents have been endorsed by the user and/or social network connections of the user. Upon receipt of a search query, it is determined whether the user is an authenticated user, for instance, whether social networking data associated with the user is available. Upon determining that user is an authenticated user, documents that have been endorsed by the user and/or social network connections of the user are searched to identify those that satisfy the input search query. The satisfying documents are assigned a relevance score that it utilized to determine whether each satisfying document is relevant enough to be shown to the user as an supplemental or additional search result and, if a document is determined to be relevant enough, to determine placement of the document on the search engine results page (SERP) relative to standard algorithmically-derived Web search results (i.e., search results determined without consideration as to whether they have been endorsed by the user and/or social network connections of the user). Upon rendering of the SERP in response to the input query, supplemental search results identifying one or more satisfying documents that have been endorsed by the user and/or at least one social network connection of the user are presented, along with an indication that the user and/or the at least one social network connection of the user endorsed the document. Thus, the supplemental or additional search result functionality described herein provides an additional source of content that is complementary to the Web search results and provides links that may be interesting to the user that may or may not have been surfaced by the Web search results.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, presenting supplemental or additional search results (i.e., results determined independent of standard algorithmically-derived Web search results) with indications that identified documents have been endorsed by the user and/or social network connections of the user. Endorsements may take many of a variety of forms including, without limitation, liking, sharing, tagging, commenting one, reading, viewing, selecting, bookmarking, saving, etc. Basically, an endorsement can be based upon any action taken by a user and/or a social connection of the user with respect to a particular document. (It should be noted that "documents" is intended to encompass any identified search result whether in textual form, audio form, image form, video form, website link, or the like.) Upon receipt of a search query, it is determined whether the user is an authenticated user. A user may be determined to be authenticated, for instance, if social networking data associated with the user is available. Upon determining that the user is an authenticated user, documents that have been endorsed by the user and/or social network connections of the user are searched to identify those that satisfy the input search query. The satisfying documents are assigned a relevance score that it utilized to determine whether each satisfying document is relevant enough to be shown to the user as a supplemental or additional search result and, if a document is determined to be relevant enough, to determine placement of the document on the search engine results page (SERP) relative to standard algorithmically-derived Web search results (i.e., search results determined without consideration as to whether they have been endorsed by the user and/or social network connections of the user). It should be noted that by use of the terms "supplemental" and "additional," the inventors hereof do not mean to imply that such result(s) were not also identified utilizing the algorithmically-derived search methods. Identical and/or similar documents may be identified utilizing both methodologies. All that is meant by use of such terms is that the additional or supplemental result(s) are determined separately from the algorithmically-derived results and utilizing different criteria.

Upon rendering of the SERP in response to the input query, supplemental search results identifying one or more satisfying documents that have been endorsed by the user and/or at least one social network connection of the user are presented, along with an indication that the at least one social network connection of the user endorsed the document. Thus, the supplemental or additional search result functionality described herein provides an additional source of content that is complementary to the Web search results and provides links that may be interesting to the user that may or may not have been surfaced by the Web search results.

Accordingly, one embodiment of the present invention is directed to one or more computer-readable storage media storing computer-useable instructions that, when used by one or more computing devices, cause the one or more computing devices to perform a method for presenting, in association with search engine results pages, supplemental results in response to search queries with indications that such supplemental results have been endorsed by a user and/or social network connections of the user. The method includes receiving a search query from the user; determining that data associated with social network connections of the user is available; determining at least one algorithmically-derived search result that satisfies the received search query; determining at least one document that satisfies the received search query and that has been endorsed by the user and/or one or more of the social network connections of the user, the at least one document being determined independent of the at least one algorithmically-derived search result; and presenting an identifier of the at least one document on a search engine results page with an indication that the at least one document has been endorsed by the user and/or the one or more of the social network connections of the user.

In another embodiment, the present invention is directed to a method being performed by one or more computing devices including at least one processor, for presenting, in association with search engine results pages, supplemental results in response to search queries with indications that such supplemental results have been endorsed by a user and/or social network connections of the user. The method includes receiving a search query from the user; determining that data associated with social network connections of the user is available; determining a plurality of algorithmically-derived search results that satisfy the received search query; determining at least one document that satisfies the received search query and that has been endorsed by one or more of the social network connections of the user, the at least one document being determined independent of the plurality of algorithmically-derived search results; and presenting an identifier of the at least one document on a search engine results page with an indication that the at least one document has been endorsed by the user and/or the one or more of the social network connections of the user along with an identification of the one or more social network connections of the user that endorsed the at least one document.

In yet another embodiment, the present invention is directed to a system for presenting, in association with search engine results pages, supplemental results in response to search queries with indications that such supplemental results have been endorsed by a user and/or social network connections of the user. The system includes a computing device associated with a search engine having one or more processors and one or more computer-readable storage media and a data store coupled with the search engine. The search engine is configured to receive a search query from the user; determine that data associated with social network connections of the user is available; determine a plurality of algorithmically-derived search results that satisfy the received search query; determine at least one document that satisfies the received search query and that has been endorsed by one or more of the social network connections of the user, the at least one document being determined independent of the plurality of algorithmically-derived search results; and present an identifier of the at least one document on a search engine results page with an indication that the at least one document has been endorsed by the user and/or the one or more of the social network connections of the user along with an identification of the one or more social network connections of the user that endorsed the at least one document.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
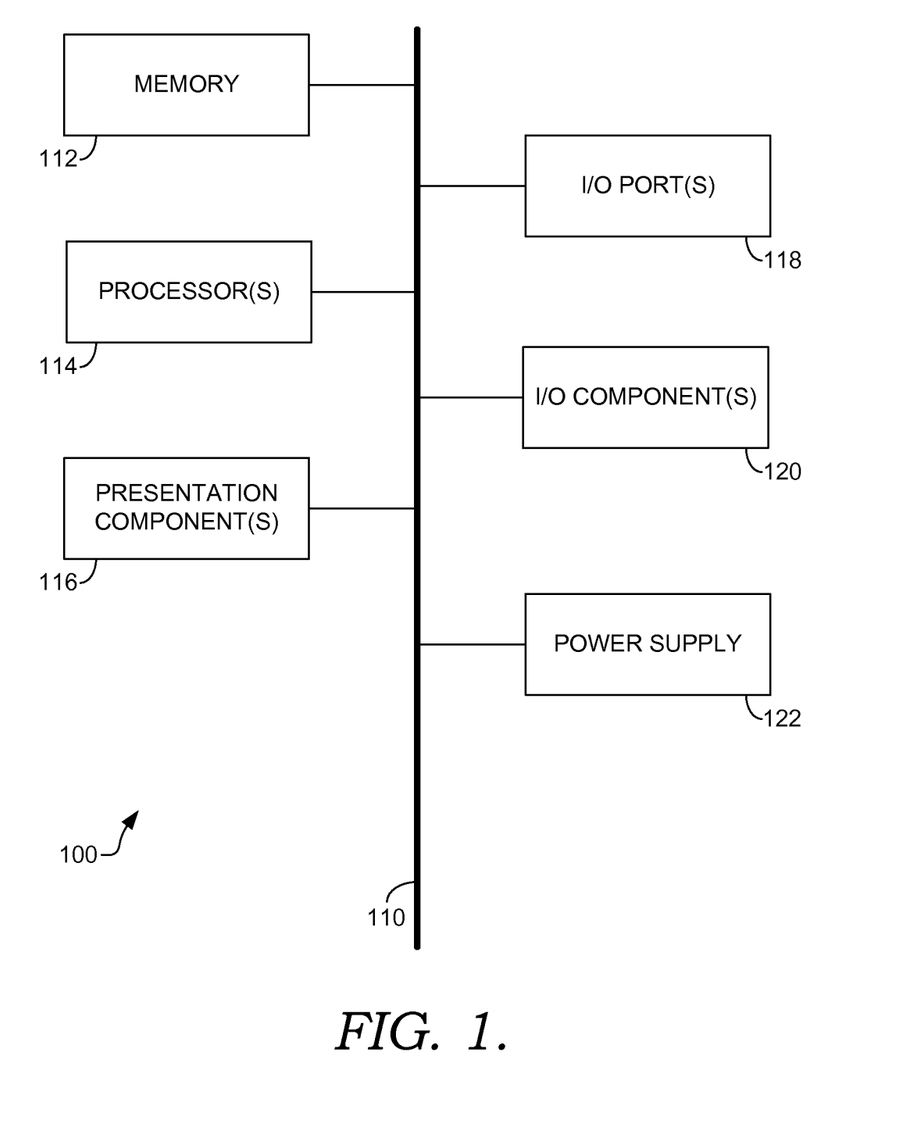
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, presenting supplemental or additional search results with indications that identified documents have been endorsed by the user and/or social network connections of the user. Upon receipt of a search query, it is determined whether the user is an authenticated user, for instance, whether social networking data associated with the user is available. Upon determining that the user is an authenticated user, documents that have been endorsed by the user and/or social network connections of the user are searched to identify those that satisfy the input search query. The satisfying documents are assigned a relevance score that it utilized to determine whether each satisfying document is relevant enough to be shown to the user as a supplemental or additional search result and, if a document is determined to be relevant enough, to determine placement of the document on the SERP relative to standard algorithmically-derived Web search results (i.e., search results determined without consideration as to whether they have been endorsed by the user and/or social network connections of the user). Upon rendering of the SERP in response to the input query, supplemental or additional search results identifying one or more satisfying documents that have been endorsed by the user and/or at least one social network connection of the user are presented, along with an indication that the user and/or the at least one social network connection of the user endorsed the document.

Figure 2:
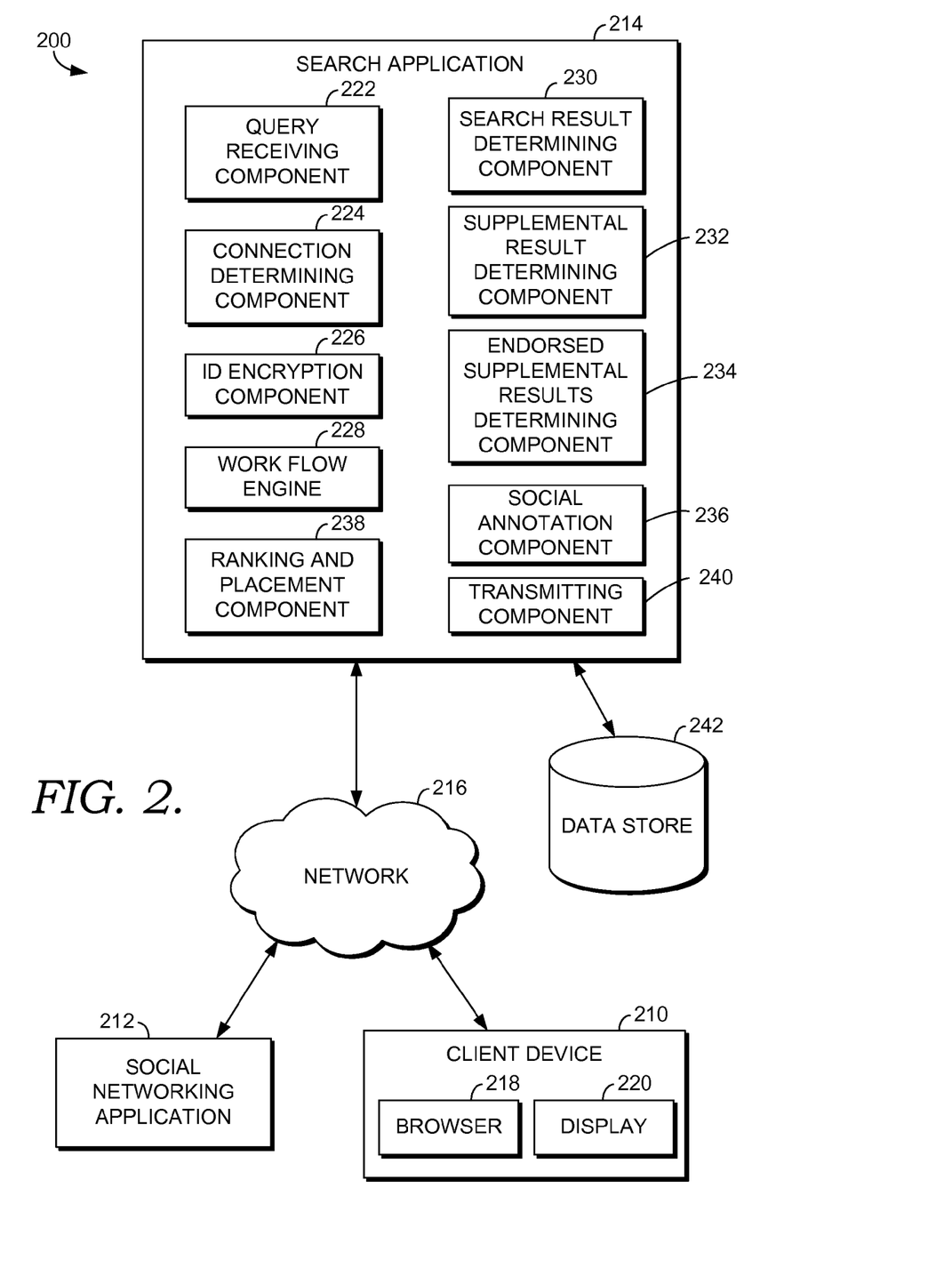
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which supplemental or additional search results are presented in association with a SERP, along with indications that identified documents have been endorsed by the user and/or social network connections of the user. Among other components not shown, the computing system 200 generally includes a client device 210, a social networking application 212, and a search application 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, social networking applications, and search applications may be employed in the computing system 200 within the scope of embodiments of the present invention. Each may comprise a single device/interface or multiple devices/interfaces cooperating in a distributed environment. For instance, the search application 214 may comprise multiple devices and/or modules arranged in a distributed environment that collectively provide the functionality of the search application 214 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the social networking application 212 and/or the search application 214. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of social networking applications, search applications, or client computing devices. By way of example only, the search application 214 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218, among other things, is configured to render search engine home pages (or other online landing pages), and render SERPs in association with the display 220 of the client computing device 210. The browser 218 is further configured to receive user input of requests for various web pages (including search engine home pages), receive user inputted search queries (generally inputted via a user interface presented on the display 220 and permitting alpha-numeric and/or textual input into a designated search box) and to receive content for presentation on the display 220, for instance, from the search application 214. It should be noted that the functionality described herein as being performed by the browser 218 may be performed by any other application capable of rendering Web content. Any and all such variations, and any combination thereof, are contemplated to be within the scope of embodiments of the present invention.

The social networking application 212 is configured to facilitate electronic social networking between its users. In this regard, the social networking application is configured to receive input of identifying information about a user and maintain such information, for instance, in a data store (not shown) associated with the social networking application 212. Identifying information may include, but is not limited to, a user profile page (the name of which is generally the name of the user to whom it pertains), one or more networks of the user, a location of the user, interests of the user, and the identity of other users with whom the user has established connections. The identifying information about the user may be input directly by the user (e.g., name, location, interests, etc.) or may be derived from information input or otherwise provided by the user. For instance, if a user inputs that s/he attended College A or that s/he works at Company B, networks associated with College A and/or Company B may be associated with the user. Exemplary social networking applications are well known in the art, for instance, a commonly known social networking application is FACEBOOK, INC. of Palo Alto, Calif.

The social networking application 212 is configured to permit its users to establish social network connections with other application users. In this way, a user may be connected to another user by a first degree connection (e.g., a "friend") meaning that the two users are directly connected with one another. Or, a user may not be directly connected with another user but have a second degree connection (e.g., a "friend of a friend") or more remote connection with that user through his/her first degree connections.

The social networking application 212 is further configured to permit its users to take particular actions with respect to documents in a social networking context and accordingly endorse such documents, that is, express a user-affinity for such documents. For instance, endorsements may include, without limitation, liking (i.e., indicate a preference or liking for the document/page), sharing, tagging, commenting on, reading, viewing, selecting, bookmarking, saving, etc. Basically, an endorsement can be based upon any action taken by a user and/or a social connection of the user with respect to a particular document. Information indicating that a particular social networking application user has endorsed a particular document is stored in association with user's social networking data.

The search application 214 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search application 214 includes a query receiving component 222, a connection determining component 224, an identification (ID) encryption component 226, a work flow engine 228, a search result determining component 230, supplemental result determining component 232, an endorsed supplemental result determining component 234, a social annotation component 236, a ranking and placement component 238 and a transmitting component 240. The illustrated search application 214 also has access to a data store 242. The data store 242 is configured to store information pertaining to user social networking identifiers and connections of users. In various embodiments, such information may include, without limitation, a name of its users' profile pages, an identity of networks of its users, a location of its users, information about its users' social network connections (first degree connections and those that are more distant or remote), and information indicating that particular documents or Web pages have been endorsed social networking users. In embodiments, the data store 242 is configured to be searchable for one or more of the items stored in association therewith. It will be understood and appreciated by those of ordinary skill in the art that the information stored in association with the data store 242 may be configurable and may include any information relevant to social networking identifiers, social network connections of a plurality of users, and identifiers of documents endorsed by the plurality of users. The content and volume of such information are not intended to limit the scope of embodiments of the present invention in any way. Further, though illustrated as a single, independent component, the data store 242 may, in fact, be a plurality of storage devices, for instance a database cluster, portions of which may reside in association with the search application 214, the social networking application 212, the client computing device 210, another external computing device (not shown), and/or any combination thereof.

In one embodiment, each endorsed instance of a Web document is stored in association with the data store 242 as its own document. Therefore, if one million social networking application 212 users endorsed a particular URL, the endorsement data is represented by one million separated documents in an index (not shown) associated with the data store 242. In addition, for each endorsed document in the index, a list of social network connections of the social networking application user that endorsed the document may also be stored. By associating all the social network connections with each endorsed document, the search application 214 can query for all documents endorsed by a user and/or the a user's social network connections with a single social networking identification. However, this results in much duplicated data in the index (both in redundant document information and redundant social network connection information).

In other embodiments, the list of social network connections associated with each instance of an endorsement associated with a document may not be stored. In addition, each indexed document is represented by a given Uniform Resource Locator (URL), and users that endorse that given URL may be indexed as a meta-word of the document. Thus, when the search application 214 queries for all documents endorsed by a user and/or a user's social network connections, retrieved is a list of all social network connections at query-time and sent to the index (not shown) as a large OR query. In order for this to be done efficiently, the index is partitioned by the users that endorsed the document identified by the given URL. At times this may result in popular documents duplicated across the index cluster but the maximum number of copies is bounded by the number of indexing units in the cluster.

The query receiving component 222 of the search application 214 is configured to receive requests for presentation of SERPs having results that satisfy an input search query (e.g., matches identified via keyword matching). Typically, such a request is received via a browser associated with a client computing device, for instance, the browser 218 associated with the client computing device 210. In embodiments, received requests for presentation of SERPs having satisfying search results are also requests for presentation of supplemental or additional search results (outside of algorithmically-derived Web search results) satisfying the search query, as more fully described below.

The connection determining component 224 is configured to determine whether a user from whom a search query is received is authenticated with at least one social networking application associated with social network connections of the user. That is, the connection determining component 224 is configured to determine whether social networking information about a user from whom a search query is received is available. In embodiments, such determination is made by determining whether or not the requesting user is engaged in an active session with the social networking application 212. A user may be engaged in an active session with the social networking application 212 by having a browser window actively logged into the social networking application. A user may also be engaged in an active session with the social networking application even without having an active window if s/he has opted in a previous active session with the social networking application to stay logged into the service even upon closure of the browser session. In another embodiment, the user may login to the social networking application 212 from the search application 214 using a social networking identifier associated with the user. Any and all such variations, and any combination thereof, are contemplated to be within the scope of embodiments of the present invention. However the user establishes an active session with the social networking application 212, being engaged in such active session permits the search application to access information about the user's social network connections.

By way of example only, the exemplary social networking application FACEBOOK, INC. of Palo Alto, Calif. employs an "instant personalization" functionality that automatically (that is, without opting-in or authentication) enables users of FACEBOOK, INC. to log onto third party websites (e.g., the search application 214) with their FACEBOOK identity and access their FACEBOOK identity information from the context of the third party website.

The connection determining component 224 is further configured to receive the user's social networking identification (ID) from the social networking application 212. The identification encryption component 226 is configured to encrypt the received social networking ID of the user to facilitate security of the users of the social networking application 212 and the search application 214.

The work flow engine 228 is configured to facilitate identification and collection of information to be presented on the SERF in response to an input query. That is, the work flow engine 228 is configured to coordinate interactions between the various other components of the search application (e.g., the search result determining component 230, the supplemental result determining component 232, the endorsed supplemental result determining component 234, and the social annotation component 236). Various ones of the search application components are dependent upon output of other components. It is the job of the work flow engine 228 to coordinate information acquisition in the most efficient and timely manner possible.

The search result determining component 230 is configured to identify search results that satisfy the input search query. In this regard, the input to the search result determining component 230 is the search query received (e.g., by the query receiving component 222) and the output is a ranked listing of documents determined to satisfy the query. Algorithms utilized for identifying and ranking results are known to those of ordinary skill in the art and, accordingly, are not further described herein.

The supplemental result determining component 232 is configured to identify one or more documents to be presented to the user in response to a query as a supplemental or additional search result. Supplemental search results are small snippets of information related to the keywords in a received query that are determined to be the most likely answer to the input query. Such supplemental results generally are determined independently of the standard algorithmically-derived Web search results and are thus results that are additional or supplementary to the algorithmically-derived Web search results satisfying the search query. In embodiments, such additional or supplemental results are presented in a specified area of the SERP that is differentiated from the algorithmically-derived Web search results. In other embodiments, such additional or supplemental results are integrated and presented in association with the standard search results. Exemplary additional or supplemental results may include weather information, news information, sports information, and the like. In accordance with embodiments of the present invention, information pertaining to social network connections of the user may be presented on the SERP as supplemental or additional search results.

The endorsed supplemental result determining component 234 is a particular supplemental results determining component that is configured to identify documents that are not only most likely to represent an answer to an input query but also ensure that identified documents have been endorsed by the user and/or one or more social network connections of the user. In this regard, the input into the endorsed supplemental result determining component 234 is the social networking ID (or encrypted social networking ID, as appropriate) and the output from the endorsed supplemental result determining component 234 is information pertaining to one or more Web documents (e.g., Uniform Resource Locators associated with identified Web documents) that not only satisfy the input search query but that have also been endorsed by the requesting user and/or at least one social network connections of the requesting user.

Thus, the endorsed supplemental result determining component 234 is configured to pass the received query and the requesting user's social networking ID (or encrypted social networking ID, as appropriate) to the data store 242 for identification of appropriate Web documents. It should be noted that in embodiments, a proxy layer (not shown) may be present between the endorsed supplemental result determining component 234 and the data store 242 that is configured to translate the query into the form needed to query an index (also not shown) associated with the data store 242 and to translate information received from the data store 242 into the appropriate form for utilization by the work flow engine 228.

As previously set forth, in one embodiment, each endorsed instance of a Web document is stored in association with the data store 242 as its own document. In addition, for each endorsed document in the index, a list of social network connections of the social networking application user that endorsed the document may also be stored. In this embodiment, the information passed to the index, and thus to the data store 242, by the endorsed supplemental result determining component 234 includes the query and the requesting user's social networking identification.

In other embodiments, the list of social network connections associated with each instance of an endorsement associated with a document may not be stored. In addition, each indexed document is represented by a given Uniform Resource Locator (URL), and users that endorse that given URL may be indexed as a meta-word of the document. Thus, when the search application 214 queries for all documents endorsed by a user or a user's social network connections, retrieved is a list of all social network connections at query-time and sent to the index (not shown) as a large OR query. In this embodiment, a first query is sent to an index that is different from the index discussed above that merely requests as list of all social network connections of the requesting user. The query and the list of social network connections of the user is then passed by the endorsed supplemental result determining component 234 to the data store 242 to find satisfying documents. Any and all such variations, and any combination thereof, are contemplated to be within the scope of embodiments hereof.

Once Web documents that satisfy the query have been determined (e.g., by the search result determining component 230), the information about the satisfying documents is passed back to the work flow engine 228. The work flow engine 228 then passes the document identification information from the search result determining component 230 and the social networking ID of the user to the social annotation component 236. The social annotation component 236 is configured to communicate with the data store 242 to identify information about the social network connection(s) of the requesting user that have endorsed the identified documents. In this regard, the social annotation component 236 is configured to query the data store 242 for a face pile or other package of information that is stored in association with the data store 242 that contains information associated with the social network connection(s) of the user that have endorsed the identified documents. The face pile (or other package of information) then may be utilized to render annotations regarding those documents that have been endorsed by the user and/or one or more social network connections of the user indicating the identity of those social network connections of the user that did the endorsing. In this regard, the face pile may include, without limitation, a user profile page (the name of which is generally the name of the social networking application user to whom it pertains), one or more networks of the user, a location of the user, and a thumbnail image associated with the user.

The user and/or social network connections of the user may be determined to have endorsed a document in a number of different ways. In the simplest instantiation, a user or social network connection of a user is determined to have endorsed a document identified by a particular URL only if the user or social network connection of the user has endorsed the exact URL associated with the document. Thus, if a social network connection of the user has endorsed the URL "cnn.com/article.12345" and that exact URL is determined to satisfy the input search query, the search result will be annotated with an indication that the particular social network connection of the user endorsed the particular URL (e.g., the annotation may read "social network connection X has endorsed this"). This type of social networking annotation may be referred to as a Type I annotation.

In other embodiments, the exact URL may not be endorsed by the user and/or a social network connection of the user but instead a webpage associated with the social networking application, the webpage being associated with or mapped to the URL, may be endorsed by the user. For instance, social networks often contain fan pages associated with particular persons or topics of interest. By way of example, the social networking application 212 may include a fan page for Lady Gaga. The fan page may then be associated with a particular webpage, for instance, ladygaga.com. Upon ladygaga.com being identified by the search application 214 as a satisfying search result, a social networking annotation may be presented in association with the URL, even though the user and/or a social network connection may not have endorsed the exact URL but instead the fan page. In this instance, the social networking annotation may read "social network connection X has endorsed Lady Gaga." This type of social networking annotation may be referred to as a Type II annotation.

In other embodiments, a user and/or a social network connection of a user may have endorsed or indicated a preference for a head domain associated with a URL determined to satisfy a search request. For instance, a user (e.g., social network connection X) may endorse the head domain "yahoo.com." Subsequently, in response to a search query, the URL "yahoo.com/article12345" may be determined to satisfy the request. Because the head domain of the URL determined to satisfy the search query is an exact match to the endorsed head domain, a social networking annotation may be presented indicating that "social network connection X has endorsed yahoo.com." Note that the user (e.g., social network connection X) need not have endorsed the exact URL satisfying the request (e.g., "yahoo.com/article12345") but rather the head domain of the URL. This type of social networking annotation may be referred to as a Type III annotation.

In still other embodiments, the exact URL determined to satisfy an input search query may not be endorsed by the user and/or a social network connection of the user but instead a webpage associated with the social networking application, the webpage being associated with or mapped to the head domain associated with the satisfying URL, may be endorsed. For instance, social networks often contain fan pages associated with particular persons or topics of interest. By way of example, the social networking application 212 may include a fan page devoted to Lady Gaga. The fan page may then be associated with or mapped to a particular webpage having the head domain "celebuzz.com," e.g., "ladygaga.celebuzz.com/blog." Upon a search result including the head domain "celebuzz.com" being identified by the search application 214 as a satisfying search result (for instance, "kimkardashian.celebuzz.com/XYZ"), a social networking annotation may be presented in association with the URL, even though the user and/or a social network connection of the user may not have endorsed the exact URL but instead a fan page associated with the head domain of the URL. In this instance, the social networking annotation may read "social network connection X has endorsed celebuzz.com." This type of social networking annotation may be referred to as a Type IV annotation.

In other embodiments of the present invention, endorsement data may be aggregated among users of a social networking application and/or a search application. In this way, endorsement data associated with users that align with the requesting user in a dimension other than by being a social network connection of the requesting user may be presented in association with search results. For instance, users that align with the requesting user may include those disclosing similar interests and/or preferences as the requesting user to the search application and/or the social networking application, for instance, via their respective application user profiles. This type of pooling or aggregating of endorsement data among a larger corpus of application users will likely result in more endorsement data than that produced only by the user and his or her social network connections which, in turn, likely will aid in increasing the number of search queries input by a requesting user that are associated with endorsement data relevant to the user.

To pool or aggregate endorsement data, interests and/or preference information associated with eligible users of a search application and/or social networking application are utilized. Eligible users may include all users of the search and/or social networking application that have not specifically expressed an interest in having their endorsement information withheld from aggregation. The interests and/or preference information of eligible users may be derived, for instance, from the respective profiles of the users associated with the search and/or social networking application, the profiles including information such as, without limitation, their fan page endorsements, location, employer, school, groups, networks, and the like. It will be understood and appreciated by those of ordinary skill in the art that any information associated with a preference and/or interest of a user may be utilized within the scope of embodiments hereof.

For each eligible user, a large dimensional sparse profile-vector is created based on their respective social networking application and search application preference and interest data. The profile-vector contains an element or identifier for each possible preference and/or interest entity, e.g., for each fan page endorsement, location, employer, school, group, network, etc., of the eligible user. For example, an eligible user (User A) may endorse the "cricket fan page" and may live or be employed in "Mountain View, Calif." In this instance, unique identifiers for the entities "cricket fan page" and "Mountain View, Calif." may be created as profile-vector elements for User A. Logically, the bit locations for the locations of these identifiers or elements on the profile-vector are switched on.

When User A endorses (expressing an affinity for) a particular URL (document), the URL receives a vote or endorsement on each of the profile-vector elements associated with User A. Thus, if User A endorses "cnn.com," the URL "cnn.com" receives a vote or endorsement from each of the "cricket fan page" and "Mountain View, Calif." profile-vector elements. For each new user that endorses the URL "cnn.com," votes are added to URL associated with the profile-vector elements of the endorsing user.

It should be noted that votes or endorsements may be normalized, for instance, to address social network application fan pages that have a lot of users. One approach for normalization is to create a reference voted URL which gets a vote whenever any URL gets a vote and then normalize the votes by taking the ratio of the URL with the reference URL.

The more dominant elements of the profile-vector endorsements associated with each URL are kept after normalization and processing all endorsement data for a pre-determined time period (e.g., one week). In embodiments, the dominant elements may be identified based upon a threshold.

To apply this functionality to supplemental or additional search results identifying an endorsed document, the computation is done on the URLs identified by the supplemental result determining component 232. For each of the URLs, the dominant features are stored as meta-words in the index. In the search phase, the query and the profile of the user are passed in the query (similar to social network connection IDs). The supplemental search result determining component 232 will match on the URLs that match the meta-words and the query. Once there is a match, the URL is annotated with a text, for instance, "People who endorsed the cricket fan page endorsed this" or "People in Mountain View, Calif. endorsed this" and presented in association with the accompanying supplemental or additional search result.

Aggregating endorsement annotations allows users to receive the benefit of endorsements of the whole of a social networking application and/or search application and not just their own connections. In fact, the IDs of the entities in the profile of the user are effectively utilized as "virtual connections" of the user. To get more annotations in relation to Web search results (and/or supplemental or additional search results), this functionality encourages users to endorse more fan pages associated with a social networking application which discloses more of their personal preferences. This behavior (vs. social-connection-only based annotation) is a faster way to grow coverage.

If a user does not like a specific result, the user can unendorse the fan page on the social network or remove the piece of his or her associated profile. This removes the annotation or result automatically and in real-time. Similarly, a user can join a fan page and instantly see annotated results from the fan page. This also improves the accuracy of the user's data. The user also has the ability to join more groups in a social networking application to get more recommended results.

With reference back to FIG. 2, the ranking and placement component 238 is a service that includes page layout architecture and ranking algorithms. As such, the ranking and placement component 238 is configured to assign a relevance score to the identified supplemental documents that have been endorsed by the requesting user and/or at least one social network connection of the requesting user. The relevance score may be determined, by way of example only, utilizing such factors as total number of social networking users connected to the user that endorsed the target document, the last endorsement timestamp associated with the document, and the number of times a queried keyword appears in the document. The relevance score is configured to be utilized to determine whether an identified document is relevant enough to be shown in association with the SERP as a supplemental or additional search result (e.g., via comparison to a threshold relevance score, or the like). The relevance score also is configured to be utilized to determine where to place the supplemental or additional search result having the endorsement information associated therewith relative to the standard Web search results (e.g., output by the search result determining component 230). Placement may be, by way of example only, at the top of the SERP, the bottom of the first presented page of the SERP, or integrated into the middle of the SERP listing of Web search results. Any and all such variations, and any combination thereof, are contemplated to be within the scope of embodiments of the present invention.

The transmitting component 240 is configured to transmit standard Web search results for presentation as on a SERP (e.g., on the display 220 associated with the client computing device 210) and to present supplemental or additional search results having indications that identified documents have been endorsed by the user and/or social network connections of the user. Presentation of such annotations is described more fully below with reference to the screen displays of FIGS. 3-12.

Figure 3:
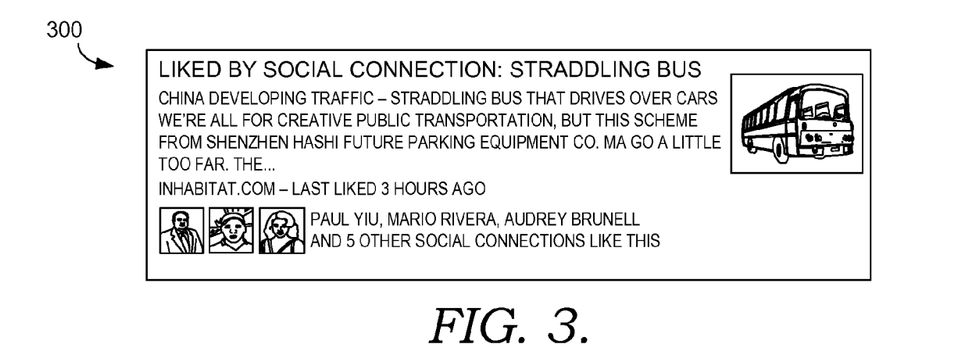
FIG. 3 is a schematic diagram showing an exemplary screen display of a supplemental or additional search result configured for presentation on a SERP, the supplemental or additional search result including a title, a caption, a source, endorsement data pertaining to social network connections of the requesting user and a thumbnail image related to the search result presented to the right of the text, in accordance with an embodiment of the present invention.

FIGS. 3-12 illustrate various ways in which supplemental or additional search results and their accompanying endorsement indications may be presented, in accordance with embodiments of the present invention. FIG. 3 is a schematic diagram showing an exemplary screen display 300 of a supplemental or additional search result configured for presentation on a SERP, the supplemental or additional search result including a title, a caption, a source, endorsement data pertaining to social network connections of the requesting user (i.e., "Paul Yiu, Mario Rivera, Audrey Brunell and 5 other social connections"), and a thumbnail image related to the search result presented to the right of the text, in accordance with an embodiment of the present invention. Note that profile images of the three named social connections are also presented.

Figure 4:
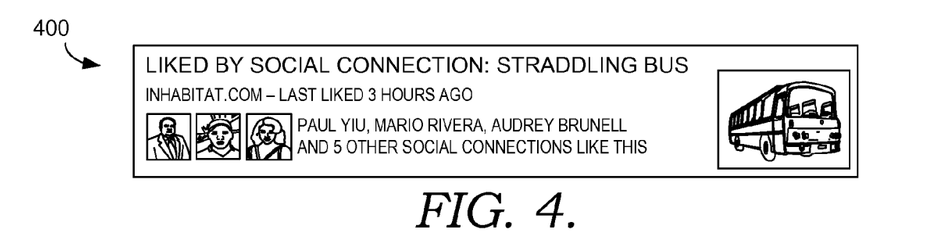
FIG. 4 is a schematic diagram showing an exemplary screen display of a supplemental or additional search result configured for presentation on a SERP, the supplemental or additional search result including a title, a source, endorsement data pertaining to social network connections of the requesting user and a thumbnail image related to the search result presented to the right of the text, in accordance with an embodiment of the present invention.

With reference to FIG. 4, a schematic diagram is illustrated showing an exemplary screen display 400 of a supplemental or additional search result configured for presentation on a SERP, the supplemental or additional search result including a title, a source, endorsement data pertaining to social network connections of the requesting user (i.e., "Paul Yiu, Mario Rivera, Audrey Brunell and 5 other social connections"), and a thumbnail image related to the search result presented to the right of the text, in accordance with an embodiment of the present invention. Note that as with FIG. 3, profile images of the three named social connections are also presented. The main difference between the presentations of FIGS. 3 and 4 is that FIG. 3 includes a caption under the title of the supplemental result and FIG. 4 does not.

Figure 5:
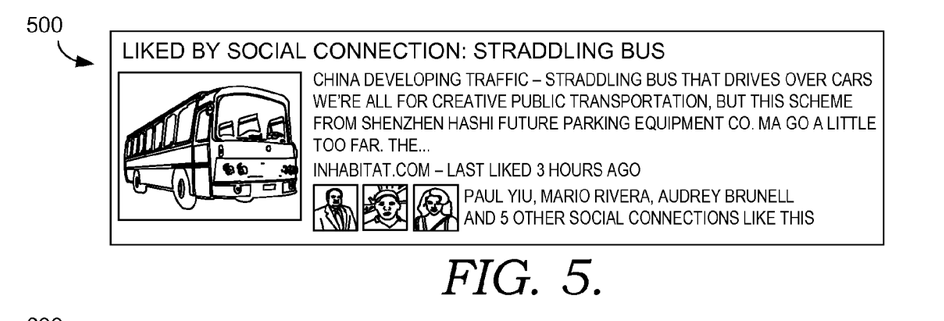
FIG. 5 is a schematic diagram showing an exemplary screen display of a supplemental or additional search result configured for presentation on a SERP, the supplemental or additional search result including a title, a caption, a source, endorsement data pertaining to social network connections of the requesting user and a thumbnail image related to the search result presented to the left of the text, in accordance with an embodiment of the present invention.

With reference to FIG. 5, a schematic diagram is illustrated showing an exemplary screen display 500 of a supplemental or additional search result configured for presentation on a SERP, the supplemental or additional search result including a title, a caption, a source, endorsement data pertaining to social network connections of the requesting user (i.e., "Paul Yiu, Mario Rivera, Audrey Brunell and 5 other social connections"), and a thumbnail image related to the search result presented to the left of the text, in accordance with an embodiment of the present invention. Note that as with FIGS. 3 and 4, profile images of the three named social connections are also presented. The main difference between the presentations of FIGS. 3 and 5 is the placement of the thumbnail image.

Figure 6:
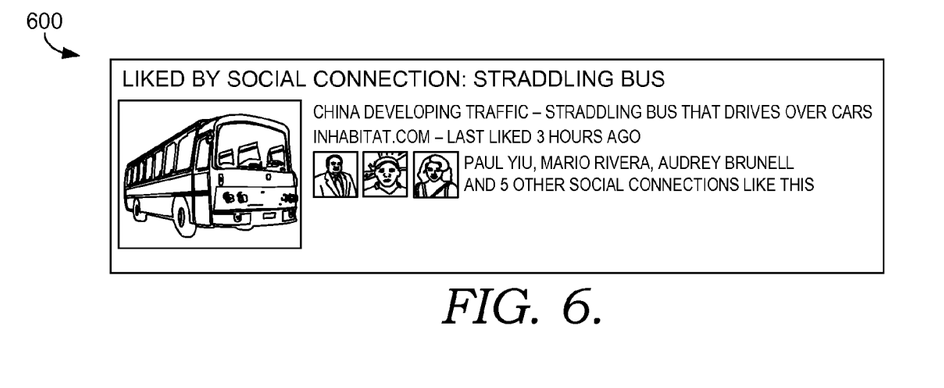
FIG. 6 is a schematic diagram showing an exemplary screen display of a supplemental or additional search result configured for presentation on a SERP, the supplemental or additional search result including a title, a source, endorsement data pertaining to social network connections of the requesting user and a thumbnail image related to the search result presented to the left of the text, in accordance with an embodiment of the present invention.

With reference to FIG. 6, a schematic diagram is illustrated showing an exemplary screen display 600 of a supplemental or additional search result configured for presentation on a SERP, the supplemental or additional search result including a title, a source, endorsement data pertaining to social network connections of the requesting user (i.e., "Paul Yiu, Mario Rivera, Audrey Brunell and 5 other social connections"), and a thumbnail image related to the search result presented to the left of the text, in accordance with an embodiment of the present invention. Note that as with FIGS. 3-5, profile images of the three named social connections are also presented. The main difference between the presentations of FIGS. 5 and 6 is that FIG. 5 includes a long caption under the title of the supplemental result and FIG. 6 includes a short caption.

Figure 7:
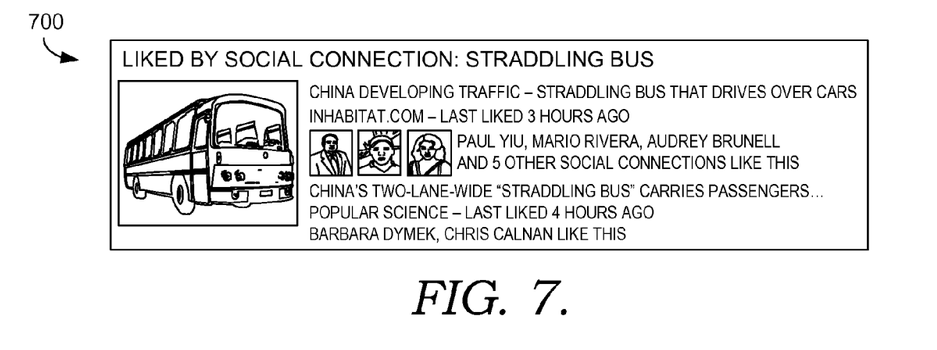
FIG. 7 is a schematic diagram showing an exemplary screen display of a supplemental or additional search result having two supplemental search results configured for presentation on a SERP, each search result having endorsement data pertaining to social network connections of the requesting user, in accordance with an embodiment of the present invention.

With reference to FIG. 7, a schematic diagram is illustrated showing an exemplary screen display 700 of a supplemental or additional search result having two supplemental search results configured for presentation on a SERP, each search result having endorsement data pertaining to social network connections of the requesting user, in accordance with an embodiment of the present invention. The presentation includes a thumbnail image related to the supplemental search results collectively presented to the left of the text. The first or primary supplemental search result includes a title, a short caption, a source, and endorsement data pertaining to social network connections of the requesting user (i.e., "Paul Yiu, Mario Rivera, Audrey Brunell and 5 other social connections"); including profile images related to the named social network connections to the left of the endorsement data. The second supplemental search result includes a title, a source, and the identity of two social network connections (i.e., Barbara Dymek, Chris Calnan") of the requesting user that have endorsed the referenced article. Note there are no presented profile images with respect to the endorsing connections for the second supplemental search results.

Figure 8:
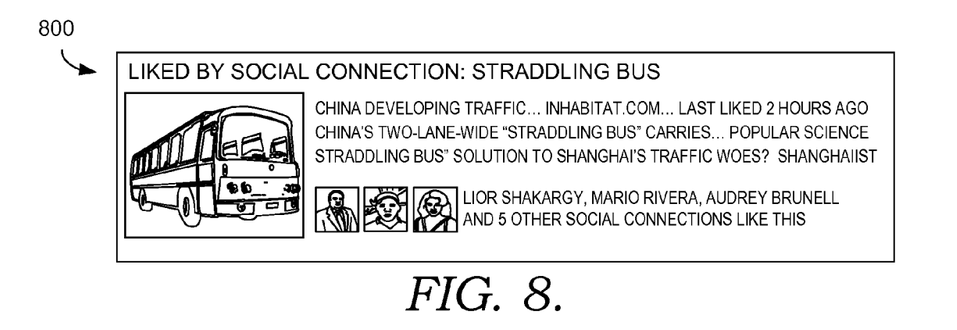
FIG. 8 is a schematic diagram showing an exemplary screen display 800 of a supplemental or additional search result having three supplemental search results configured for presentation on a SERP, the three search results collectively having endorsement data pertaining to social network connections of the requesting user, in accordance with an embodiment of the present invention.

With reference to FIG. 8, a schematic diagram is illustrated showing an exemplary screen display 800 of a supplemental or additional search result having three supplemental search results configured for presentation on a SERP, the three search results collectively having endorsement data pertaining to social network connections of the requesting user, in accordance with an embodiment of the present invention. The presentation includes a thumbnail image related to the supplemental search results collectively presented to the left of the text. Each result includes a title and source. The collective endorsement data pertains to social network connections of the requesting user (i.e., "Lior Shakargy, Mario Rivera, Audrey Brunell and 5 other Social Connections Like This") and includes profile images related to the named social network connections to the left of the endorsement data.

Figure 9:
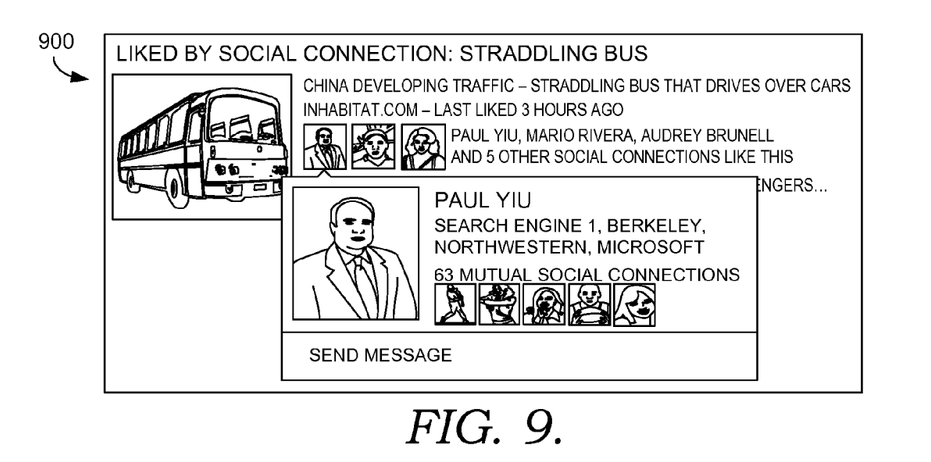
FIG. 9 is a schematic diagram showing an exemplary screen display of a supplemental or additional search result configured for presentation on a SERP, the supplemental or additional search result having selectable endorsement data pertaining to social network connections of the requesting user, in accordance with an embodiment of the present invention.

With reference to FIG. 9, a schematic diagram is illustrated showing an exemplary screen display 900 of a supplemental or additional search result configured for presentation on a SERP, the supplemental or additional search result having selectable endorsement data pertaining to social network connections of the requesting user, in accordance with an embodiment of the present invention. The illustrated embodiment shows the screen display 700 of FIG. 7 with selection of (or hovering over) the profile image related to "Paul Yiu." Such action permits the requesting user to view additional information about his or her endorsing social network connections and provides the option for the requesting to send a message to the endorsing user, as desired.

Figure 10:
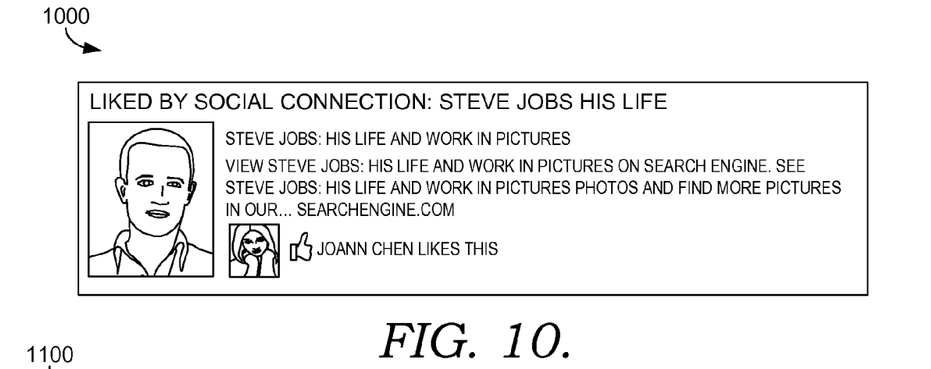
FIG. 10 is a schematic diagram showing an exemplary screen display of a supplemental or additional search result configured for presentation on a SERP, the supplemental search result having endorsement data pertaining to a social network connection of the requesting user, in accordance with an embodiment of the present invention.

With reference to FIG. 10, a schematic diagram is illustrated showing an exemplary screen display 1000 of a supplemental or additional search result configured for presentation on a SERP, the supplemental search result having endorsement data pertaining to a social network connection ("Joann Chen") of the requesting user, in accordance with an embodiment of the present invention. The supplemental search result includes a title, a caption, a source, and a thumbnail image related to the supplemental search result presented to the left of the text. The endorsement data includes a profile image of the social network connection on the left.

Figure 11:
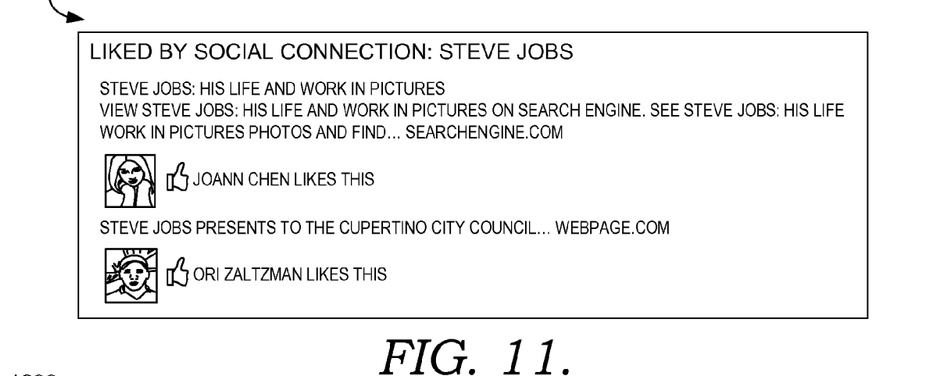
FIG. 11 is a schematic diagram showing an exemplary screen display of two supplemental or additional search results configured for presentation on a SERP, in accordance with an embodiment of the present invention.

With reference to FIG. 11, a schematic diagram is illustrated showing an exemplary screen display 1100 of two supplemental or additional search results configured for presentation on a SERP, in accordance with an embodiment of the present invention. Each supplemental result includes a title, a source, and the identity (with profile image) of a social network connection that endorsed the referenced article.

Figure 12:
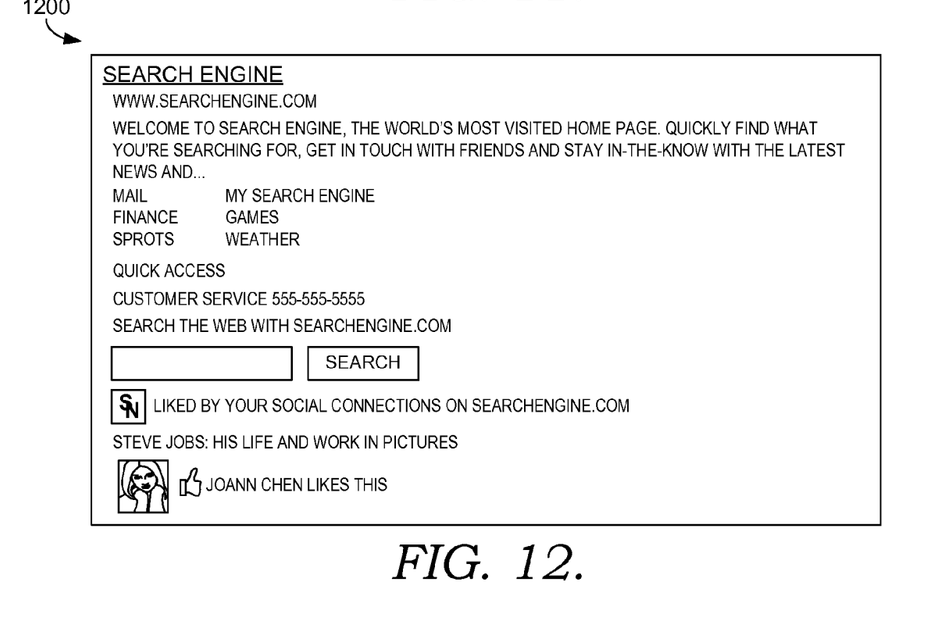
FIG. 12 is a schematic diagram showing an exemplary screen display of a supplemental or additional search result having a restricted domain search result configured for presentation on a SERP, each search result having endorsement data pertaining to a user and/or a user's social network connections, in accordance with an embodiment of the present invention.

With reference to FIG. 12, a schematic diagram is illustrated showing an exemplary screen display 1200 of a supplemental or additional search result having a restricted domain search result configured for presentation on a SERP, the search result having endorsement data pertaining to a social network connection of the user (i.e., "Joann Chen") that endorsed the referenced article, in accordance with an embodiment of the present invention.

Figure 13:
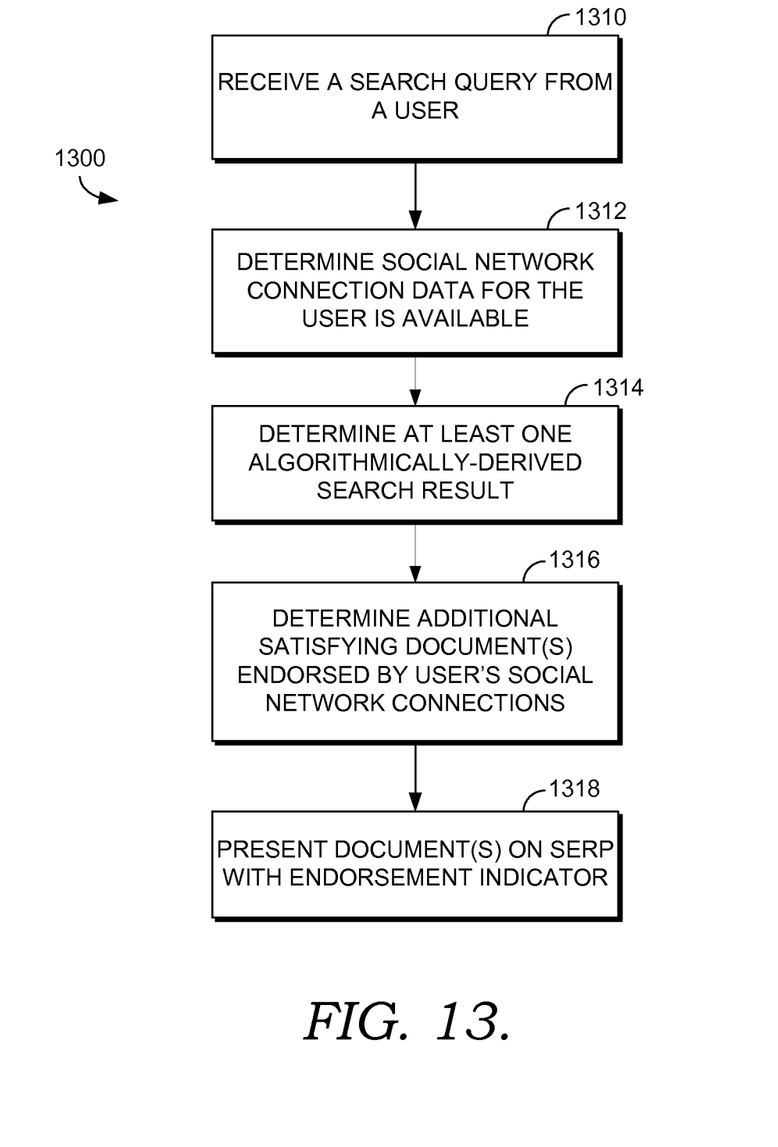
FIG. 13 is a flow diagram showing an exemplary method for presenting, in association with a SERP, supplemental or additional results of search queries with indications that such results have been endorsed by a user and/or a social network connections, in accordance with an embodiment of the present invention.

With reference to FIG. 13, a flow diagram is provided that illustrates an exemplary method 1300 for presenting, in association with a SERP, supplemental or additional search results in response to search queries with indications that such supplemental or additional search results have been endorsed by a user and/or social network connections of the user, in accordance with an embodiment of the present invention. Initially, as indicated at block 1310, a search query is received from a user, e.g., via search query input field of a user interface associated with a search application. As indicated at block 1312, it is also determined that data associated with one or more social network connections of the user is available. In accordance with embodiments hereof, such data may be determined to be available if the user is connected to a social networking application.

As indicated at block 1314, at least one algorithmically-derived search result that satisfies the received search query is determined. Also determined is at least one additional or supplemental document that satisfies the received search query and that has been endorsed by the user and/or social network connections of the user, as indicated at block 1316. The at least one document is determined independent of the at least one algorithmically-derived search result. That is, the at least one additional search result is determined independent of standard Web search algorithms for determining satisfying search results. Rather, endorsed documents are searched to identify those that satisfy the received search query. (It should be noted that by use of the terms "supplemental" and "additional," the inventors hereof do not mean to imply that such result(s) were not also identified utilizing the algorithmically-derived search methods. Identical and/or similar documents may be identified utilizing both methodologies. All that is meant by use of such terms is that the additional or supplemental result(s) are determined separately from the algorithmically-derived results and utilizing different criteria.) One or more identified documents are presented, as indicated at block 1318, as a supplemental or additional search result with an indication that the identified documents have been endorsed by the user and/or social network connections of the user.

Figure 14:
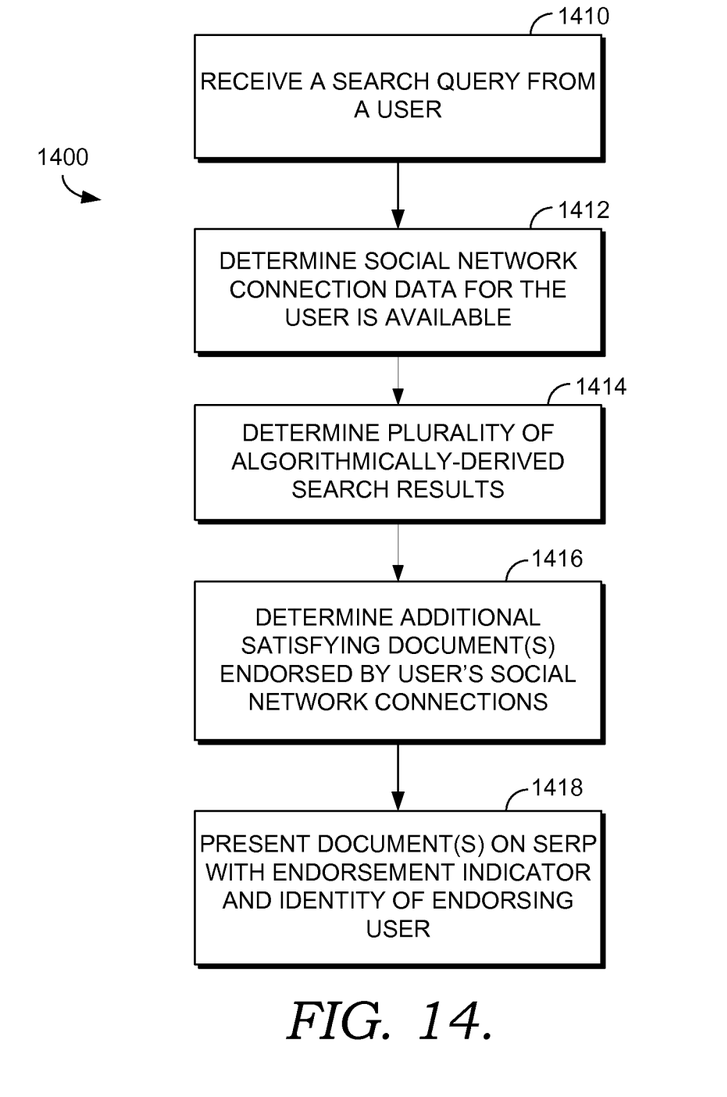
FIG. 14, a flow diagram is illustrated showing a method for presenting, in association with SERPs, supplemental search results in response to search queries with indications that such supplemental results have been endorsed by a user and/or social network connections of the user, in accordance with an embodiment of the present invention.

Turning now to FIG. 14, a flow diagram is illustrated showing a method 1400 for presenting, in association with SERPs, supplemental search results in response to search queries with indications that such supplemental results have been endorsed by a user and/or social network connections of the user, in accordance with an embodiment of the present invention. Initially, as indicated at block 1410, a search query is received from a user, e.g., via search query input field of a user interface associated with a search application. As indicated at block 1412, it is also determined that data associated with social network connections of the user is available. In accordance with embodiments hereof, such data may be determined to be available if the user is connected to a social networking application.

As indicated at block 1414, a plurality of algorithmically-derived search results that satisfy the received search query is determined. Also determined is at least one additional or supplemental document that satisfies the received search query and that has been endorsed by the user and/or social network connections of the user, as indicated at block 1416. The at least one document is determined independent of the at least one algorithmically-derived search result. One or more identified documents are presented, as indicated at block 1418, as a supplemental or additional search result with an indication that the identified documents have been endorsed by the user and/or social network connections of the user. Also presented is an identification of the endorsing social network connection(s).

As can be understood, embodiments of the present invention provide systems and methods for presenting, in association with search engine results pages, supplemental or additional search results with indication that identified documents have been endorsed by a user and/or social network connections of the user. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 1300 of FIG. 13 and 1400 of FIG. 14 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage memory media storing computer-useable instructions that, when used by one or more computing devices, cause the one or more computing devices to perform a method for presenting, in association with search engine results pages, supplemental results in response to search queries with indications that such supplemental results have been endorsed by a user and/or social network connections of the user, the method comprising:
   receiving a search query from the user;
   determining that data associated with social network connections of the user is available;
   determining at least one algorithmically-derived search result that satisfies the received search query;
   determining at least one document that satisfies the received search query and that has been endorsed by the user and/or one or more of the social network connections of the user, wherein an endorsement made by the user and/or one or more of the social network connections of a different document than the at least one document is determined as being an endorsement of the at least one document made by the user and/or one or more of the social network connections, the at least one document being determined independent of the at least one algorithmically-derived search result; and
   presenting an identifier of the at least one document on a search engine results page with an indication that the at least one document has been endorsed by the user and/or the one or more of the social network connections of the user.

2. The one or more computer-readable storage memory media of claim 1, wherein the method further comprises presenting an identification of the user and/or the one or more social network connections of the user that endorsed the at least one document.

3. The one or more computer-readable storage memory media of claim 1, wherein the method further comprises presenting the at least one algorithmically-derived search result that satisfies the received search query on the search engine results page.

4. The one or more computer-readable storage memory media of claim 1, wherein determining that data associated with the social network connections of the user is available comprises determining that the user is engaged in an active session with a social networking application associated with the data.

5. The one or more computer-readable storage memory media of claim 4, wherein the data associated with the social network connections of the user is retrieved from a data store associated with the social networking application.

6. The one or more computer-readable storage memory media of claim 1, wherein receiving the search query from the user comprises receiving the search query via a user interface associated with a search application, and wherein the data associated with the social network connections of the user is retrieved from a data store associated with the search application.

7. The one or more computer-readable storage memory media of claim 1,
   wherein the method further comprises assigning a relevance score to the at least one document, the relevance score being based, at least in part, on endorsement data of the at least one document;
   and wherein presenting an identifier of the at least one document on a search engine results page comprises presenting an identifier of the at least one document on a search engine results page when the relevance score meets or exceeds a threshold relevance score.

8. The one or more computer-readable storage memory media of claim 1, wherein the method further comprises:
   presenting the at least one algorithmically-derived search result that satisfies the received search query on the search engine results page; and
   utilizing a relevance score to determine placement of the at least one document on the search engine results page relative to the at least one algorithmically-derived search result.

9. The one or more computer-readable storage memory media of claim 1, wherein the social network connections of the user include first degree social network connections.

10. A method being performed by one or more computing devices including at least one processor, for presenting, in association with search engine results pages, supplemental results in response to search queries with indications that such supplemental results have been endorsed by a user and/or social network connections of the user, the method comprising:
    receiving a search query from the user;
    determining that data associated with social network connections of the user is available;
    determining a plurality of algorithmically-derived search results that satisfy the received search query;
    determining at least one document that satisfies the received search query and that has been endorsed by one or more of the social network connections of the user, wherein an endorsement by the one or more of the social network connections of a different document than the at least one document is determined as being an endorsement of the at least one document made by the one or more of the social network connection, the at least one document being determined independent of the plurality of algorithmically-derived search results;

assigning a relevance score to the at least one document, the relevance score being based, at least in part, on endorsement data of the at least one document; and presenting an identifier of the at least one document on a search engine results page based on the relevance score, the presenting being with an indication that the at least one document has been endorsed by the user and/or the one or more of the social network connections of the user along with an identification of the one or more social network connections of the user that endorsed the at least one document.

11. The method of claim 10, further comprising presenting at least a portion of the plurality of algorithmically-derived search results that satisfy the received search query on the search engine results page.

12. The method of claim 10, wherein determining that data associated with the social network connections of the user is available comprises determining that the user is engaged in an active session with a social networking application associated with the data.

13. The method of claim 12, wherein the data associated with the social network connections of the user is retrieved from a data store associated with the social networking application.

14. The method of claim 10, wherein receiving the search query from the user comprises receiving the search query via a user interface associated with a search application, and wherein the data associated with the social network connections of the user is retrieved from a data store associated with the search application.

15. The method of claim 10, wherein presenting an identifier of the at least one document on a search engine results page comprises presenting an identifier of the at least one document on a search engine results page when the relevance score meets or exceeds a threshold relevance score.

16. The method of claim 10, further comprising:
presenting at least a portion of the plurality of algorithmically-derived search results that satisfy the received search query on the search engine results page; and
utilizing a relevance score of the at least one document to determine placement of the at least one document on the search engine results page relative to the presented algorithmically-derived search results.

17. The method of claim 10, wherein the social network connections of the user include first degree social network connections.

18. A system for presenting, in association with search engine results pages, supplemental results in response to search queries with indications that such supplemental results have been endorsed by a user and/or social network connections of the user, the system comprising:

a computing device associated with a search engine having one or more processors and one or more computer-readable storage media; and a data store coupled with the search engine, wherein the search engine:
receives a search query from the user;
determines that data associated with social network connections of the user is available;
determines a plurality of algorithmically-derived search results that satisfy the received search query;
determines first and second documents that satisfy the received search query and that have been endorsed by one or more of the social network connections of the user, wherein an endorsement made by the user and/or one or more of the social network connections of a different document than the first document is determined as being an endorsement of the first document made by the user and/or one or more of the social network connections based on the at least one document being mapped to a URL of the different document, the at least one document being determined independent of the plurality of algorithmically-derived search results; and
presents identifiers of the first and second documents on a search engine results page with annotations comprising indications that the first and second documents have been endorsed by the user and/or the one or more of the social network connections of the user along with identifications of the one or more social network connections of the user that were determined as having endorsed the first and second documents, wherein the annotations of the first and second documents are of different annotation types based on different manners in which the first and second documents were determined as having been endorsed by the user and/or one or more of the social network connections.

19. The system of claim 18, wherein the search engine further assigns a relevance score to the first document, the relevance score being based, at least in part, on endorsement data of the first document, and wherein upon the search engine presenting an identifier of the first document on a search engine results page, presented is also an identifier of the first document on a search engine results page when the relevance score meets or exceeds a threshold relevance score.

20. The system of claim 18, wherein the search engine further:
presents at least a portion of the plurality of algorithmically-derived search results that satisfy the received search query on the search engine results page; and
utilizes a relevance score of the first document to determine placement of the first document on the search engine results page relative to the presented algorithmically-derived search results.

* * * * *